US006377611B1

(12) United States Patent
Hwang

(10) Patent No.: US 6,377,611 B1
(45) Date of Patent: Apr. 23, 2002

(54) APPARATUS AND METHOD FOR A DSSS/CDMA RECEIVER

(75) Inventor: Ho-Chi Hwang, Chutung (TW)

(73) Assignee: Industrial Technology Research Institute (TW)

(*) Notice: Subject to any disclaimer, the term of this patent is extended or adjusted under 35 U.S.C. 154(b) by 0 days.

(21) Appl. No.: 09/240,608

(22) Filed: Feb. 1, 1999

(51) Int. Cl.[7] .......................... H03J 13/02; H03J 13/04
(52) U.S. Cl. .................... 375/140; 375/142; 375/143; 375/144; 375/148; 375/150; 375/152; 370/335; 370/342; 370/320; 370/350; 370/441; 370/479; 708/300; 708/320; 708/322; 708/323
(58) Field of Search ................. 375/136, 140, 375/142, 143, 144, 148, 150, 152; 370/320, 335, 342, 350, 441, 479, 503; 708/300, 319, 320, 322, 323

(56) References Cited

U.S. PATENT DOCUMENTS

| | | | |
|---|---|---|---|
| 5,247,470 A | * 9/1993 | McKown et al. | 364/724.11 |
| 5,343,496 A | * 8/1994 | Honig et al. | 375/1 |
| 5,757,791 A | * 5/1998 | Kanterakis et al. | 370/342 |
| 6,069,912 A | * 5/2000 | Sawahashi et al. | 375/142 |
| 6,240,099 B1 | * 5/2001 | Lim et al. | 370/441 |
| 6,301,293 B1 | * 10/2001 | Huang et al. | 375/206 |

OTHER PUBLICATIONS

Aboulnasr et al., "A Robust Variable Step–Size LMS–Type Algorithm: Analysis and Simulations," IEEE Transactions on Signal Processing (1997), 45:631–639.

Zečević et al., "Blind Adaptation Algorithms for Direct–Sequence Spread–Spectrum CDMA Single–User Detection," Proceedings of IEEE Vehicular Technology Conference (1997), pp. 2133–2137.

Liu et al., "A Pipelined Digital Differential Matched Filter FPGA Implementation & VLSI Design," IEEE 1996 Custom Integrated Circuits Conference (1996), pp. 75–78.

Madhow et al., "MMSE Interference Suppression for Direct–Sequence Spread Spectrum CDMA," IEEE Transactions on Communications (1994), 42:3178–88.

Mathews et al., "A Stochastic Gradient Adaptive Filter with Gradient Adaptive Step Size," IEEE Transactions on Signal Processing (1993), 41:2075–87.

Kwong et al., "A Variable Step Size LMS Algorithm," IEEE Transactions on Signal Processing (1992), 40:1633–42.

* cited by examiner

Primary Examiner—Chi Pham
Assistant Examiner—Khanh Tran
(74) Attorney, Agent, or Firm—Finnegan, Henderson, Farabow, Garrett & Dunner, L.L.P.

(57) ABSTRACT

An MMSE linear detector is implemented using a variable step-size Griffiths' algorithm. The received signal is sampled and stored. The stored samples are multiplied with components of a spreading sequence to provide products that are summed to provide a first output. The stored samples are also multiplied with components of a weight vector to provide products that are summed to provide a second output. A computing unit uses the Griffiths' algorithm to iteratively compute the weight vector. Another computing unit computes the step-size for each successive iteration of the Griffiths' algorithm based on the first and second outputs.

10 Claims, 4 Drawing Sheets

APPARATUS AND METHOD FOR A DSSS/CDMA RECEIVER

BACKGROUND OF THE INVENTION

1. Field of Invention

The present invention relates to receivers for DSSS/CDMA communication systems. More particularly, the present invention relates to receivers including an MMSE linear detector implemented using Griffiths' algorithm.

2. Description of the Related Art

Code-division multiple access (CDMA) is one of several methods of multiplexing wireless users. In direct sequence spread spectrum CDMA (DSSS/CDMA) communications systems, users are multiplexed by distinct spreading codes rather than by orthogonal frequency bands, as in frequency-division multiple access (FDMA), or by orthogonal time slots, as in time-division multiple access (TDMA). That is, all CDMA users transmit simultaneously over the same frequency spectrum. In a single-user detector, the conventional receiver operates as a matched correlator to detect the signal of interest by correlating the entire received signal with the particular user's code waveform. Since the received signal is composed of the sum of all users' signals plus additive white Gaussian noise (AWGN), the signals from other users will deteriorate the performance of the matched correlator. This fact results from the random time offsets between users, which make it impossible to design the code waveforms to be completely orthogonal. Multiple access interference (MAI) is thus a factor which limits the capacity and performance of the DSSS/CDMA systems.

The performance of the matched correlator is further degraded by imperfect power control. A nearby interfering user of large power will have a significant impact on the reception of a highly attenuated signal of interest. The so-called near-far problem can be mitigated by an optimal multiuser detector. The detector yields the most likely transmitted sequence of all users to maximize the probability that the estimated sequence was transmitted given the received signal extending over the whole message. This probability is referred to as the joint a posteriori probability, and the receiver is known as a maximum-likelihood sequence (MLS) detector. A problem of the MLS approach is that the implementation complexity is very high. Another disadvantage is that it requires knowledge of the received amplitudes and phases of all users. These values, however, are not known in advance and must be estimated. Therefore, suboptimal but near-far resistant receivers have been developed.

One suboptimal but near-far resistant receiver is a minimum mean-squared error,(MMSE) detector. The MMSE linear detector utilizes the cyclostationarity of the highly structured MAI to mitigate the near-far problem and has a moderate complexity in comparison with the matched correlator. For a particular user, the MMSE detector adopts a finite-impulse response (FIR) filter to estimate the transmitted signal. To mitigate the interference, the FIR filter is designed such that the mean-squared error between the transmitted signal and the estimate is minimized.

A DSSS/CDMA communication system including an MMSE linear detector is disclosed in "MMSE Interference Suppression for Direct-Sequence Spread-Spectrum CDMA" by U. Madhow et al., IEEE Trans. Commun., vol. 42, pp. 3178–3188, December 1994, which is incorporated herein by reference. In a system such as disclosed therein, the received signal vector r(j) of one symbol interval can be expressed by $$r(j) = \sum_{l=1}^{L} b_l[j] A_l c_l + x(j) \tag{1}$$

where $b_l[j] \in [-1, +1]$ is the transmitted symbol, $A_l$ is the received amplitude, $c_l \in R^{N \times 1}$ is the signal srector of the lth user, L is the number of users and x(j) is the vector of AWGN samples. Taking the first user to be the desired transmission, the MMSE linear detector demodulates the symbol of interest as $\hat{b}_l[j] = \text{sgn}(w^T r(j))$ where the FIR filter tap-weight vector w minimizes the mean-squared error (MSE) between the desired symbol and the test statistic. The symbol "T" indicates the matrix transpose operation. The optimum tap-weight vector $w_n$ can be expressed as $$w_o = R^{-1} p \tag{2}$$

where $R = E\{r(j) r^T(j)\}$ and $p = E\{b_l[j] r(j)\}$ are the correlation matrix of the received signal vector and the cross-correlation vector between the desired signal and the received signal vector, respectively.

The tap-weights of the MMSE linear detector can be obtained by solving the Wiener-Hopf equation. However, the computation load is high since the calculation involves matrix inversion and multiplication. The MMSE linear detector can also be implemented by adaptive algorithms rather than from a direct solution involving matrix computation. The least mean square (LMS) algorithm and the recursive least squares algorithm have been used to train the MMSE detector on the assumption that a pilot signal is available. For practical applications, when ttie interference is time-varying or unknown, the MMSE linear detector can be implemented adaptively by the blind Griffiths' algorithm. The Griffiths' algorithm uses the desired signal vector instead of a training sequence of symbols for initial adaptation. When the desired signal vector is perfectly known and the step-size is small enough, the Griffiths' algorithm will drive the linear detector to converge to the Wiener-Hopf solution. "Blind Adaptation Algorithms for Direct-Sequence Spread-Spectrum CDMA Single-User Detection" by N. Zecevic et al., Proceedings of IEEE Vehicular Technology Conference, pp. 2133–2137, 1991. discloses an adaptive receiver for a DSSS/CDMA system using the Griffiths' algorithm as the adaptation algorithm, and is incorporated herein by reference.

The Griffiths' algorithm, like the LMS algorithm, is an approximate implementation of the method of steepest descent. Generally, the method of steepest descent solves the Wiener-Hopf equation by updating the filter tap-weights recursively. Since the method of steepest descent still requires the correlation matrix, the computation load is not easy to handle. Using the instantaneous estimate instead of the correlation matrix can reduce the computation load. The resultant algorithm is the Griffiths' algorithm.

More particularly, if the correlation matrix R and the cross-correlation vector p are known, the method of steepest descent has an updating equation for a tap-weight vector w expressed as $$w(j+1) = w(j) + \mu[p - Rw(j)] \tag{3}$$

where $\mu$ is a small fixed step-size. The Griffiths' algorithm simplifies the updating equation (3) by replacing the correlation matrix with an instantaneous estimate $r(j) r^T(j)$, but still must have the knowledge of the cross-correlation vector p in advance. For the DSSS/CDMA communication system, the cross-correlation vector p becomes $A_l c_l$, where $c_1$ is the spreading sequence of interest if the timing synchronization between the receiver and the symbol clock of interest is perfect. The Griffiths' algorithm can thus be expressed as $$w(j+1)=w(j)+\mu[c_f-z(j)r(j)] \quad (4)$$

where $\mu$ is a small step-size and $z(j)=w^T(j)r(j)$ is the output of the detector.

A disadvantage of the Griffiths' algorithm is that, like the LMS algorithm, its convergence properties depend on the eigenvalue spread of the correlation matrix associated with the received signal vectors. As the interference level or the number of users increases, the problem of eigenvalue spread will be severe such that the convergence speed of the Griffiths' algorithm with be very slow.

Several variable step-size (VSS) LMS algorithms have been proposed to accelerate convergence speed. In general, these methods employ a procedure that uses a larger step-size to obtain a faster convergence speed when the error signal is large, and adopt a smaller step-size to obtain a smaller mean-square error as the error signal decreases. For example, "A Variable Step Size LMS Algorithm" by R. H. Kwong et al., IEEE Trans. Signal Processing, vol. 40, pp. 1633–1642, July 1992, discloses an LMS algorithm in which the step-size at the jth iteration can be controlled by the instantaneous error signal e(j).

"A Robust Variable Step Size LMS-Type Algorithm: Analysis and Simulation," by T. Aboulnasr et al., IEEE Trans. Signal Processing, vol. 45, pp. 631–639, March 1997, discloses an LMS algorithm which employs an estimate of the correlation between successive error samples e(j) and e(j–1) to control the step-size. The controlling algorithm results from the fact that both the error energy and the correlation between successive error samples are small when the LMS filter is converging to the optimum solution.

"A stochastic gradient adaptive filter with gradient adaptive step size," by V. J. Mathews et al., IEEE Trans. Signal Processing, vol. 41, pp. 2075–2087, June 1993, discloses an adaptive filter that controls the step-size according to a stochastic gradient descent procedure on the squared output error.

Generally, numerical simulation results show that the VSS LMS algorithms improve the convergence properties significantly compared to the LMS algorithm with a fixed step-size. However, these VSS LMS algorithms cannot be used for blind training since they require a training sequence.

SUMMARY OF INVENTION

To achieve these and other advantages and in accordance with the purpose of the invention, as embodied and broadly described, the invention is directed to a receiver for receiving a signal in a direct sequence spread spectrum CDMA (DSSS/CDMA) communication system, in which the received signal is sampled, and in which a weight vector is computed using Griffiths' algorithm. The receiver comprises means for multiplying the received signal samples with components of a predetermined spreading sequence to provide first products and for summing the first products to provide a first output; means for multiplying the received signal samples with components of the weight vector to provide second products and for summing the second products to provide a second output; and means, coupled to receive the first and second outputs, for computing a step-size for each successive iteration of the Griffiths' algorithm.

Also in accordance with the present invention there is provided a receiver for receiving a signal in a direct sequence spread spectrum CDMA (DSSS/CDMA) communication system. The receiver comprises means for sampling the received signal; first means for multiplying the received signal samples with components of a predetermined spreading sequence to provide first products and for summing the first products to provide a first output; second means for multiplying the received signal samples with components of a weight vector to provide second products and for summing the second products to provide a second output; means for computing the weight vector using Griffiths' algorithm, wherein successive iterations of the Griffiths' algorithm are controlled by a step-size; and means, coupled to receive the first and second outputs, for computing the step-size for each successive iteration of the Griffiths' algorithm performed by the computing means.

Further in accordance with the present invention there is provided a method for receiving a signal in a direct sequence spread spectrum CDMA (DSSS/CDMA) communication system. The method comprises sampling the received signal and for storing the received signal samples; multiplying the received signal samples with components of a predetermined spreading sequence to provide first products and summing the first products to provide a first output; multiplying the received signal samples with components of a weight vector to provide second products and summing the second products to provide a second output; computing the weight vector using Griffiths' algorithm, wherein successive iterations of the Griffiths' algorithm are controlled by a step-size; and computing, based on the first and second outputs, the step-size for each successive iteration of the Griffiths' algorithm performed by the computing means.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate an embodiment of the invention and together with the description serve to explain the principles of the invention.

DETAILED DESCRIPTION

The present invention is directed to a receiver method and apparatus including an MMSE linear detector implemented using a low-complexity variable step-size (VSS) Griffiths' algorithm to accelerate convergence speed. Since the error signal cannot be directly obtained in a blind environment, a suitable measure to control the step-size is implemented. Numerical simulation results described below demonstrate that the VSS Griffiths' algorithm can improve the convergence properties significantly in comparison with a Griffiths' receiver using a fixed step-size, and especially in the presence of strong MAI.

The MMSE linear receiver implemented using the Griffiths' algorithm according to the present invention is designed to demodulate the transmitted symbol for a specific user. That is, the receiver is suitably used as a single-user receiver. An example of a use for the receiver is in a mobile terminal that only demodulates it symbols. By incorporating several MMSE linear receivers in parallel, with each receiver designed for a distinguished user, the bank of the parallel MMSE receivers will demodulate all symbols from different users. An example of a use for a bank of parallel receivers is in a base station, since it is required to demodulate all symbols from different mobile terminals.

Figure 1:
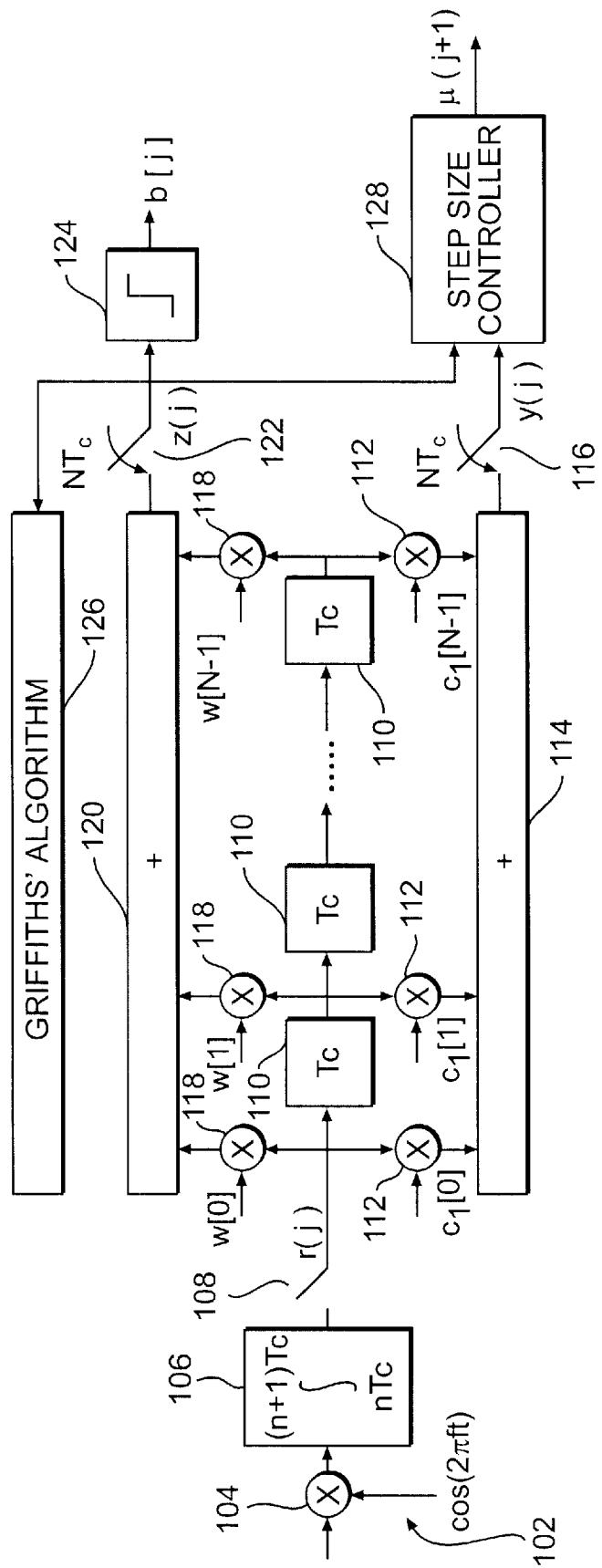
FIG. 1 illustrates a block diagram of an MMSE linear detector implemented using a VSS Griffiths' algorithm according to the present invention.

FIG. 1 illustrates a block diagram of an MMSE linear detector 100 implemented using a VSS Griffiths' algorithm according to the present invention. With reference to FIG. 1, detector 100 includes a down converter 102 including a mixer 104 for converting a continuous received signal from the pass band to the baseband. Mixer 104 can be implemented as an analog device in application specific integrated circuitry (ASIC). A low-pass filter 106 and sampler 108 filter the continuous received baseband signal and take samples thereof once every chip duration with a sample period $T_c$, to yield received signal samples that constitute the received signal vector r(j). As used herein, each period of the transmitted waveform is referred to as a chip. Sampler 108 can be provided as an analog-to-digital (A/D) converter which samples and holds the received signal and converts it to digital form. While FIG. 1 shows sampler 108 coupled to receive the output of filter 106, these two elements can be reversed so that filter 106 receives the digital output of sampler 108. Thus, depending on whether filter 106 is coupled to the input or output of sampler 108, it is implemented in analog or digital form, respectively, and preferably as an ASIC to process the high transmission rate of the received signal.

The received signal samples are held in storage buffers 110 which hold the received signal samples within one symbol interval. Buffers 110 can be implemented in random access memory.

The received samples constituting the received signal vector r(j) are multiplied by $c_l[0], \ldots, c_l[N-1]$ using multipliers 112, where $c_l$ is a spreading sequence for a particular user of interest, e.g., user no. 1, where N is the length of the spreading sequence. The products of these multiplications are summed by a summer 114. The sum accumulated by summer 114 is outputted to a sampler 116 that samples with a sampling period $NT_c$. Thus, the number of received signal samples within one symbol interval ($NT_c$) is exactly the number of the spreading sequence. As N received signal samples from one symbol interval are collected, the symbol in the corresponding interval is demodulated. Sampler 116 performs the function of holding the accumulated sum when the summation of N multiplied samples is completed. The configuration for multiplying the received signal vector r(j) with the spreading sequence $c_l$ constitutes a matched correlator having an output r(j) outputted by sampler 116. While the structure of the matched correlator is shown for a general case as including multipliers 112, actual multiplication is not required when the spreading sequence $c_l$ is antipodal, as in the illustrated embodiment. In such a case, if the spreading code $c_l[i]$ is 1, then the $i^{th}$ sample of the received signal is added to the accumulated sum, while if $c_l[i]$ is −1, then the $i^{th}$ sample is subtracted. The matched correlator can be implemented in microprocessor based circuitry.

The received signal samples are also multiplied by $w[0], \ldots, w[N-1]$, which are components of a tap-weight vector w, using multipliers 118. Thus, multipliers 118 perform multiplication of digital values. The products of these multiplications are summed by a summer 120. The sum accumulated by summer 120 is output to a sampler 122 that samples with the sampling period $NT_c$. The configuration for multiplying the received signal vector r(j) with the tap weight vector w constitutes an MMSE detector having an output z(j) outputted from sampler 122. The MMSE detector can be implemented in ASIC.

MMSE detector output z(j) is applied to a decision element 124 which determines the identity of the received symbol, i.e., {+1,−1} and outputs the determined symbol b[j].

A Griffiths' algorithm computation unit 126 computes the components $w[0], \ldots, w[N-1]$ of the tap-weight vector w according to equation (4) above. Unit 126 can be implemented in ASIC. A step-size controller 128 is coupled to receive signals y(j) and z(j) and compute a variable step-size $\mu(j+1)$ for use by computation unit 126 to update the tap-weight vector w to enable the MMSE detector to compute the next received symbol. The computation performed by controller 128 is described more fully below and can be implemented by a microprocessor.

Since there is no desired signal for the Griffiths' algorithm, no error signal is available to indicate whether the convergence is achieved or not. Apparatus and method according to the present invention controls the step-size used in the Griffiths' algorithm in order to improve the convergence properties of the algorithm. When the Griffiths' algorithm converges, it is expected that the following equation is satisfied $$c_l^T RE\{w(j)\} \to c_l^T c_l = 1, j \to \infty \qquad (5)$$

Hence, the term $[1-c_l^T Rw(j)]$ can be used as a convergence indicator.

Because the correlation matrix R is not known in advance, the direct calculation of $c_l^T Rw(j)$ is required to estimate R. For this purpose, the following low-complexity recursive estimator for $c_l^T Rw(j)$ based on the property of $c_l^T Rw = E\{c_l^T r(j)r^T(j)w\}$ is used:

$$\lambda(j)=(1-\beta)\lambda(j-1)+\beta y(j)z(j) \qquad (6)$$

where y(j) is the output of the matched correlator utilizing $c_l$, β is a smoothing factor in recursive estimation, and $\lambda(-1)=0$ is the initial estimate. The value of β is usually a small decimal fraction, typically less than 0.1.

The squared difference between 1 and $\lambda(j)$ can thus be used to control the step-size through $$\mu(j+1)=\mu_{max}(1-e^{-AD(j)}) \qquad (7)$$

where $D(j)=(1-\lambda(j))^2$. This is the computation performed by step-size controller 128. Since the spreading sequence is antipodal, the estimation of $\lambda(j)$ can be easily implemented. The mechanism controlling the step-size, as shown in FIG. 1, is thus low-complexity. For further simplicity, the exponential calculation in step-size controller 128 can be replaced by a soft-limiter or a piece-wise linear function. The maximum step size $\mu_{max}$ can be selected in accordance with techniques practiced in the adaptive filtering field. An equation that can be used to select the maximum step size is $$\mu_{max} = \frac{2}{\text{total signal power}} = \frac{2}{E\{\|r(j)\|^2\}}. \qquad (8)$$

In equation (8), the total signal power can be recursively estimated by squaring, summing and averaging.

Because there are multiple solutions to $c_l^T Rw=1$, the tap-weight vector w at some time may be in a position that is away from the Wiener-Hopf solution, while the estimated $\lambda(j)$ is very close to unity and the resultant step-size is very small. In such a case, the tap-weight vector w will be trapped around the wrong solution due to a very small step-size for the next iteration. To mitigate such a problem, a lower bound can be imposed on the step-size such that an excessively small step-size is excluded. For example, the constraint $\mu(j+1)=\mu_{min}$, if $\mu(j+1)<=\mu_{min}$, can be imposed in step-size controller 128.

The convergence of the MMSE receiver 100 is considered next. Let v(j) be an error weight vector denoted as $v(j)=w(j)-w_s$, where $w_s=R^{-1}c_l$ is the scaled version of the optimum tap weight vector $w_o$ to which the Griffiths' algorithm drives the receiver. Thus, the error weight vector can be $$v(j+1)=[I-\mu(j)r(j)r^T(j)]v(j)+\mu(j)[u_l-W_s^T r(j)r(j)]. \tag{9}$$

Taking the expected value of both sides of equation (9) yields $$V_M(j+1)=[I-E\{\mu(j)\}R]v_M(j) \tag{10}$$

where $v_M(j)=E\{v(j)\}$ is the mean error weight vector. Equation (10) is stable if and only if $$\prod_{n=0}^{j}[I-E\{\mu(n)\}R] \to 0, \text{ as } j \to \infty. \tag{11}$$

A sufficient condition for equation (11) to hold is thus given by the following inequality $$E\{\mu(n)\} < \frac{2}{\lambda_{max}} \tag{12}$$

where $\lambda_{max}$ is the maximum eigenvalue of the matrix R.

Using the trace inequality, the inequality on the norm is given by $$\left|1-E\{\mu(j)\}\lambda_{max}\right| \le \frac{|v_M(j+1)|}{|v_M(j)|} \le \left|1-E\{\mu(j)\}\lambda_{min}\right|. \tag{13}$$

Since $\lambda_{max} \ge 0$ and $\lambda_{max} \ge \lambda_{min}$, the factors $|1-E\{\mu(j)\}\lambda_{max}|$ and $|1-E\{\mu(j)\}\lambda_{min}|$, must be less than unity for an $E\{\mu(j)\}$ which satisfies the inequality (12). Therefore, the length of the mean error weight for the VSS Griffiths' algorithm is reduced by a factor of at least $|1-E\{\mu(j)\}\lambda_{min}|$ after each iteration.

The mean-squared norm of the error weight vector is determined next. Using a small enough step-size, the Griffiths' algorithm will drive the linear detector to the Wiener-Hopf solution after a large number of iterations. The mean convergence error can be defined as $M(j)=E\{|c_l-Rw(j)|^2\}$. Since the correlation matrix R is symmetric, there exist matrices Q and D such that $R=Q^T DQ$ and $Q^T Q=I$. The column vectors of the matrix Q come from the eigenvectors and the matrix D is a diagonal matrix, whose diagonal elements are the eigenvalues of R. The mean convergence error can thus be expressed alternatively as $$M(j)=E\{v^T(j)R^2 v(j)\}=tr\{D^2 E\{v_t^T(j)v_t(j)\}\} \tag{14}$$

where $v_t(j)=Q^T v(j)$. Let $r_t(j)=Q^T r(j)$, $c_{l,t}=Q^T c_l$, and $w_{s,t}=Q^T w_s$, Then $$v_t(j+1)=[I-\mu(j)r_t(j)r_t^T(j)]v_t(j)+\mu(j)[c_{l,t}-w_{s,t}^T r_t(j)r_t(j)]. \tag{15}$$

To proceed further, two additional assumptions are made. The first assumption is that the step-size $\mu(j)$ is independent of r(j) and v(j). The second assumption is that the received signal vector is assumed to be Gaussian distributed with zero mean. When the number of active users is large, this second assumption is reasonable.

Postmultiplying both sides of equation (15) by $v_t(j+1)$ and then taking the expected values yields $$G(j+1)=G(j)-E\{\mu(j)\}DG(j)-E\{\mu(j)\}G(j)D+E\{\mu^2(j)\}[2DG(j)D+Dtr(DG(j))]$$

$$+E\{\mu^2(j)\}[c_{l,t}E\{v_t^T(j)\}D+c_{l,t}^T E\{v_t(j)\}D]+E\{\mu^2(j)\}[DE\{v_t(j)\}c_{l,t}^T+E\{v_t^T(j)\}c_{l,t}^T D]$$

$$+E\{\mu^2(j)\}[c_{l,t}c_{l,t}^T+w_{s,t}^T c_{l,t}D], \tag{16}$$

where G is the correlation matrix of $V_t(j+1)$. Here, the Gaussian factoring theorem is used to represent the expression $E\{r_t(j)r_t^T(j)v_t(j)v_t^T(j)r_t(j)r_t^T(j)\}$ into a sum of second-order moments. After manipulation, the mean difference can be expressed as $$E\{D(j)\} \approx (1-\beta)^2 E\{D(j-1)\} + \tag{17}$$

$$2\beta(1-\beta)\left[1-\beta\sum_{n=0}^{j-1}(1-\beta)^{j-1-n}c_1^T RE\{w(n)\}\right]$$

$$(1-c_1^T RE\{w(j)\})$$

Consequently, the mean and the mean-square behavior of the step-size are $$E\{\mu(j)\}=\mu_{max}(1-e^{-AE(D(j))})$$

$$E\{\mu^2(j)\}=\mu^2_{max}(1-e^{-AE(D(j))})^2. \tag{18}$$

The mean convergence error behavior is completely described by equations (14)–(18).

Figure 2:
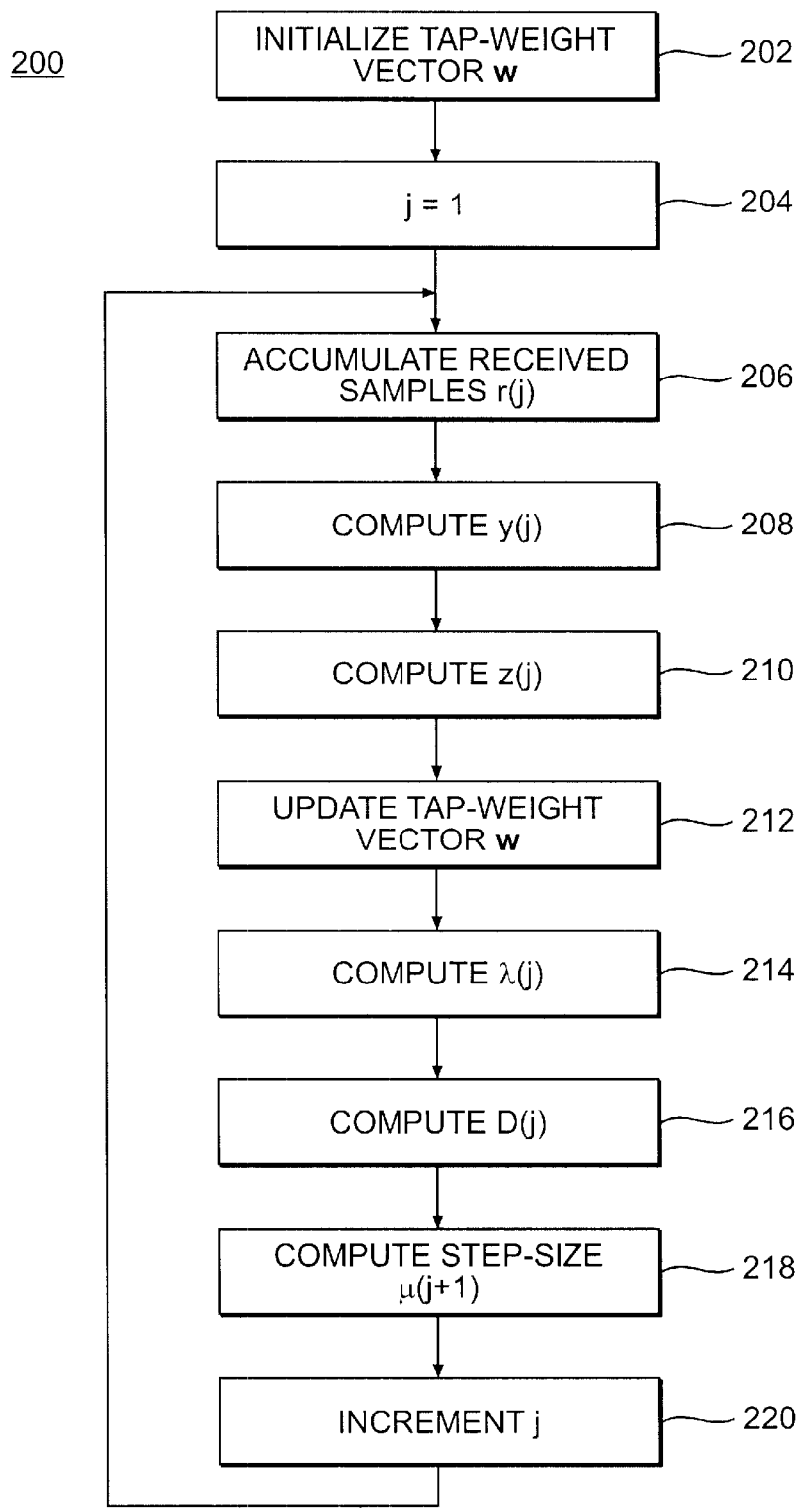
FIG. 2 illustrates a flow chart of a method for operating an MMSE linear detector consistent with the present invention.

FIG. 2 is a flow chart of a method 200 for operating an MMSE linear detector implemented using a VSS Griffiths' algorithm consistent with the present invention. First, the tap-weight vector w is initialized to zero for the first iteration (step 202). Next, the iteration index j is initialized at j=1 (step 204). In step 206, samples r(j) of the received signal are accumulated. The output y(j) is computed by the matched correlator (step 208) and the output z(j) is computed by the MMSE detector (step 210). Then the tap-weight vector w is updated by the Griffiths' algorithm using equation (4) (step 212). Then an estimator $\lambda(j)$ for $c_l^T Rw(j)$ is computed by the step-size controller (step 214). The difference D(j) is calculated next (step 216). After this, the step-size $\mu(j+1)$ for the next iteration of the Griffiths' algorithm is calculated (step 218). At step 220, the value of is incremented. Following step 220 the method returns to step 206. There is no limit on the value of j since the computation of the Griffiths' algorithm is continued to adjust the tap-weight vector in order to track the varying channel parameters.

Simulations were performed to compare the convergence properties of the VSS Giffiths' algorittum to the fixed step-size (FSS) Griffiths' algorithm. An asynchronous DSSS/CDMA communication system with K=6 users was considered over the AWGN channel. Each user was modulated by a unique Gold sequence with the code length N=15. The adaptive MMSE receiver was assumed to be perfectly synchronized to the desired transmission, while the delays of the interfering users were chosen randomly. The near-far ratio, defined as $$NFR_k = \frac{A_k^2}{A_1^2},$$

denotes the power ratio between the kth (k=2 . . . , K) user and the desired user. The signal-to-noise ratio (SNR), defined as $$SNR = \frac{A_1^2 N}{\sigma^2}$$

where $\sigma^2$ is the variance of the AWGN samples, was always 20 dB in the simulations. The results were obtained by averaging over 500 independent runs, in which the receiver had the knowledge about the received amplitude of the desired user for demonstrating the transient behavior of the MSE.

Figure 3A:
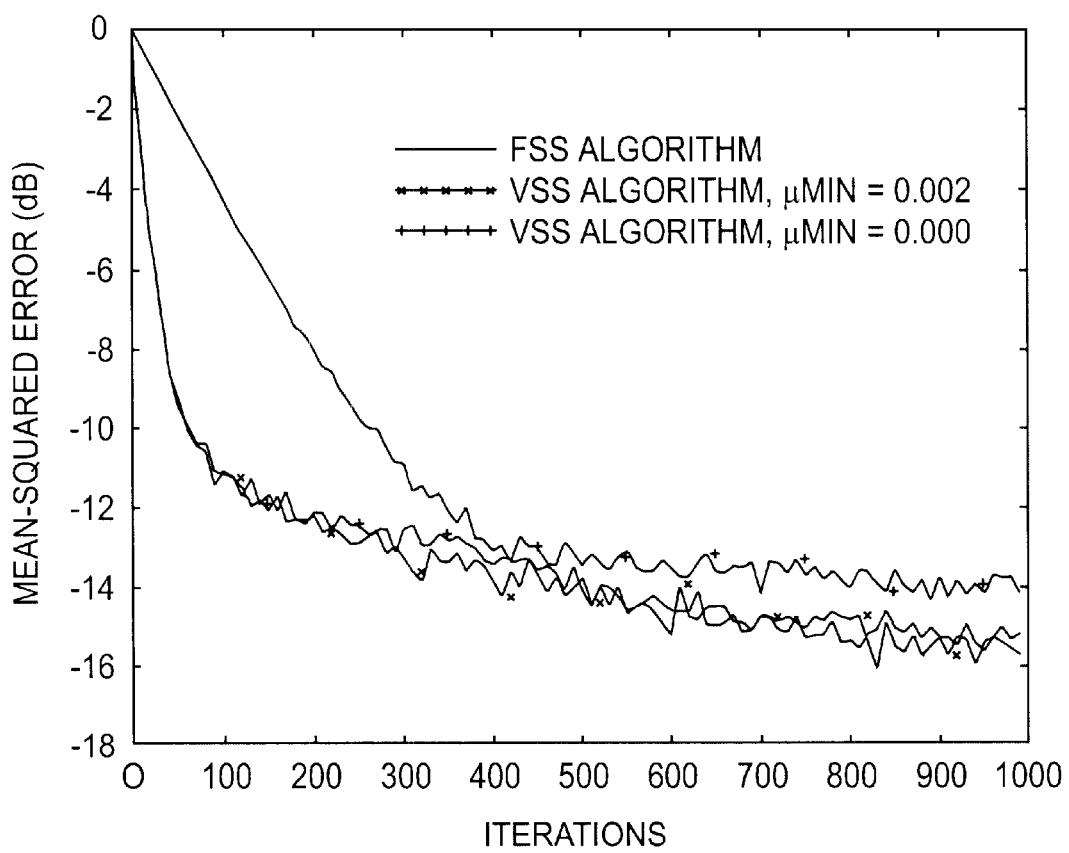
FIGS. 3(a) and 3(b) illustrate plots of results of simulations performed to demonstrate performance of apparatus and method according to the present invention.

In the first simulation, the equal power situation was considered. The step-size of the FSS Griffiths' algorithm was chosen as $\mu=0.005$ in order to achieve a compromise between an acceptable steady-state MSE and the convergence speed. The VSS Griffiths' algorithm was implemented with the parameters $\mu_{max}=0.05$. $\beta=0.01$ and A=1.0. Two values of $\mu_{min}=0.002$ and $\mu_{min}=0$ were used. The plots in FIG. 3(a) illustrate the results of the simulation. With reference to FIG. 3(a), the VSS Griffiths' algorithm with $\mu_{min}=0.002$ provided a faster convergence speed than the FSS algorithm while retaining the same level of steady-state MSE. On the other hand, the VSS algorithm with $\mu_{min}=0$ can improve the convergence properties, but with a larger MSE level. This phenomenon demonstrates that no lower bound imposed on the step-size may cause the tap-weight vector to be trapped in a position away from the global solution.

Figure 3B:
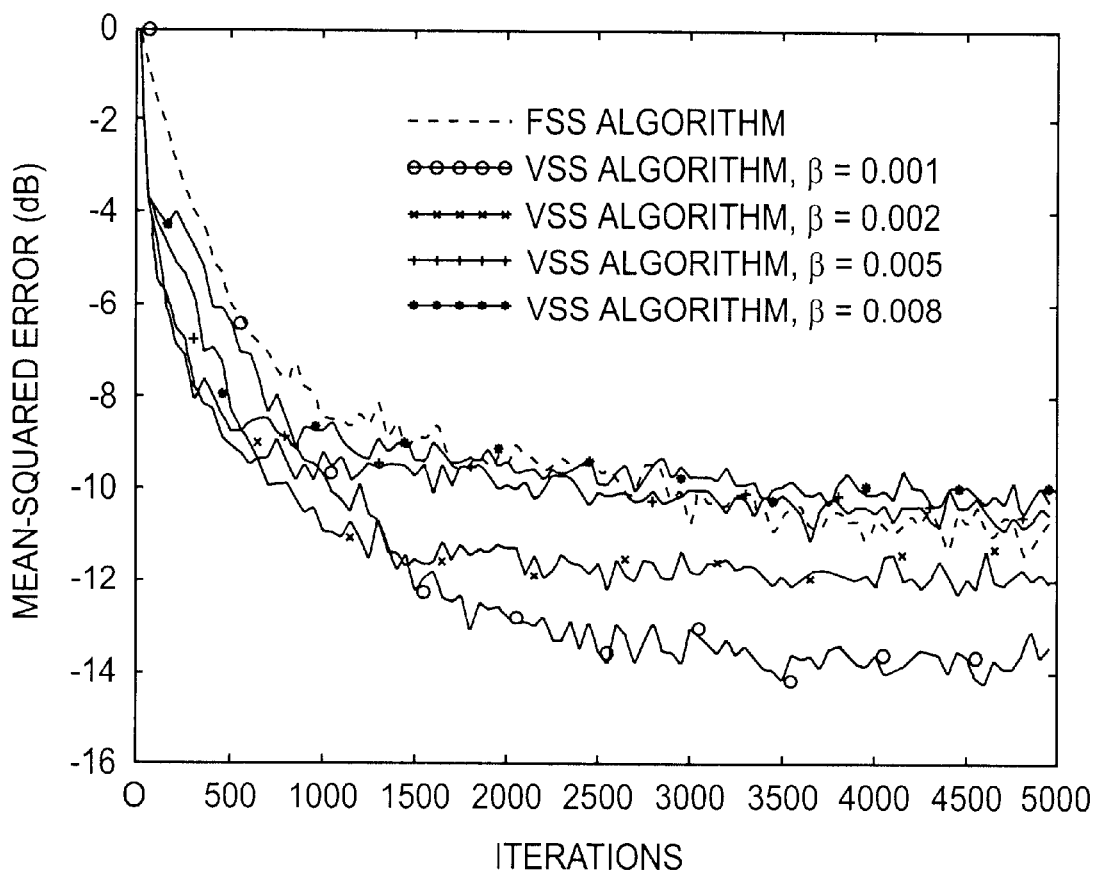

In the second simulation, a strong interference level was considered. The interfering users had the same power, which is 12 dB relative to the desired user. The step-size of the FSS Griffiths' algorithm was chosen $\mu=0.002$, while the VSS algorithm was implemented with the parameters $\mu_{max}=0.05$, $\mu_{min}=0.0002$ and A=0.32. The parameter $\beta$ was chosen as {0.001, 0.002, 0.005, 0.008}, respectively. The plots in FIG. 3(b) show that the FSS Griffiths' algorithm takes a long time to converge with an acceptable steady-state MSE. In contrast, the VSS Griffiths' algorithm can improve the convergence properties with an additional low-complexity step-size controller. The VSS Griffiths' algorithm with $\beta=0.001$ can produce the smallest steady-state MSE since small $\beta$ implies a more accurate estimate in the strong interference environment.

While the disclosed receiver samples the received signal at a rate of one sample per chip, the invention is not so limited. A receiver that takes more than one sample per chip is within the scope of the invention. The increased sample rate can provide greater robustness against timing error, but with an increased hardware cost.

It will be apparent to those skilled in the art that various modifications and variations can be made in the apparatus and method of the present invention without departing from the spirit or scope of the invention. Thus, it is intended that the present invention cover the modifications and variations of this invention provided they come within the scope of the appended claims and their equivalents.

What is claimed is:

1. A receiver for receiving a signal in a direct sequence spread spectrum CDMA (DSSS/CDMA) communication system, in which the received signal is sampled, and in which a weight vector is computed using Griffiths' algorithm, the receiver comprising:

means for multiplying the received signal samples with components of a predetermined spreading sequence to provide first products and for summing the first products to provide a first output;

means for multiplying the received signal samples with components of the weight vector to provide second products and for summing the second products to provide a second output; and means, coupled to receive the first and second outputs, for computing a step-size for each successive iteration of the Griffiths' algorithm.

2. A receiver for receiving a signal in a direct sequence spread spectrum CDMA (DSSS/CDMA) communication system, comprising:

means for sampling the received signal;

first means for multiplying the received signal samples with components of a predetermined spreading sequence to provide first products and for summing the first products to provide a first output;

second means for multiplying the received signal samples with components of a weight vector to provide second products and for summing the second products to provide a second output;

means for computing the weight vector using Griffiths' algorithm, wherein successive iterations of the Griffiths' algorithm are controlled by a step-size; and means, coupled to receive the first and second outputs, for computing the step-size for each successive iteration of the Griffiths' algorithm performed by the computing means.

3. The receiver of claim 2 further including means for storing the received signal samples;

wherein the first and second multiplying means multiply the received signal samples stored in the storing means with the spreading sequence components and the weight vector components, respectively.

4. The receiver of claim 2 wherein the step-size computing means includes:

means for computing an estimator $\lambda(j)$ according to:

$$\lambda(j)=(1-\beta)\lambda(j-1)+\beta y(j)z(j)$$

wherein y(j) is the first output, z(j) is the second output, and $\beta$ is a smoothing factor; and means for computing a step $\mu(j+1)$ for the next iteration of the Griffiths' algorithm according to:

$$\mu(j+1)=\mu_{max}(1-e^{-AD(j)})$$

wherein $D(j)=(1-\lambda(j))^2$, and $\mu_{max}$ is a maximum step-size.

5. The receiver of claim 2 further including means for receiving the second output and for identifying a received symbol.

6. The receiver of claim 4 further including means for receiving the second output and for identifying a received symbol.

7. A method for receiving a signal in a direct sequence spread spectrum CDMA (DSSS/CDMA) communication system, comprising:

sampling the received signal and for storing the received signal samples;

multiplying the received signal samples with components of a predetermined spreading sequence to provide first products and summing the first products to provide a first output;

multiplying the received signal samples with components of a weight vector to provide second products and summing the second products to provide a second output;

computing the weight vector using Griffiths' algorithm, wherein successive iterations of the Griffiths' algorithm are controlled by a step-size; and computing, based on the first and second outputs, the step-size for each successive iteration of the Griffiths' algorithm performed by the computing means.

8. The method of claim 7, wherein the computing the step-size includes:

computing an estimator $\lambda(j)$ according to:

$$\lambda(j)=(1-\beta)\lambda(j-1)+\beta y(j)z(j)$$

wherein $y(j)$ is the first output, $z(j)$ is the second output, and $\beta$ is a smoothing factor; and computing a step $\mu(j+1)$ for the next iteration of the Griffiths' algorithm according to:

$$\mu(j+1)=\mu_{max}(1-e^{-AD(j)})$$

wherein $D(j)=(1\lambda(j))^2$, and $\mu_{max}$ is a maximum step-size.

9. The method of claim 7 further including receiving the second output and identifying a received symbol.

10. The method of claim 8 further including receiving the second output and identifying a received symbol.

* * * * *